Figure 1:
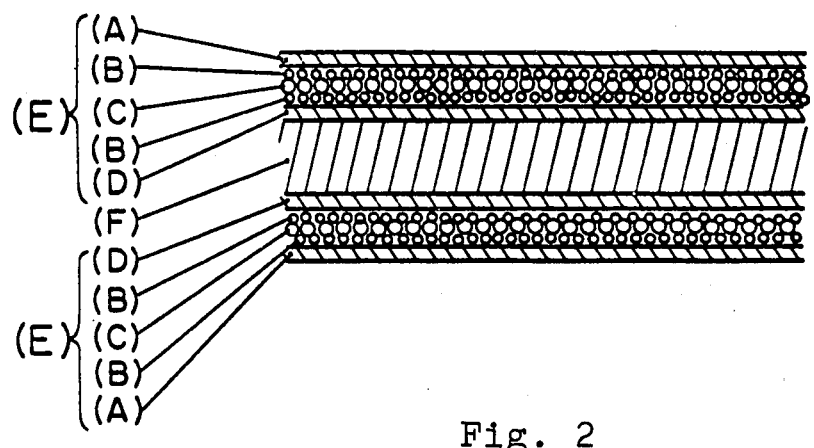

United States Patent [19]

Fujita et al.

[11] 4,405,682

[45] Sep. 20, 1983

[54] METHOD FOR PRODUCING FIRE-RESISTANT, THERMALLY INSULATING BOARD

[75] Inventors: Shoichi Fujita, Minoo; Katsuhisa Kodama, Nishinomiya; Kiyohiro Yuge, Yawata, all of Japan

[73] Assignee: Takeda Chemical Industries, Ltd., Osaka, Japan

[21] Appl. No.: 243,452

[22] Filed: Mar. 13, 1981

[30] Foreign Application Priority Data

Mar. 19, 1980 [JP] Japan .................... 55-35194

[51] Int. Cl.³ .................... B32B 5/18; C29K 3/28; B32B 5/30; B29D 27/04
[52] U.S. Cl. .................... 428/317.7; 428/319.1; 428/920; 428/921; 428/331; 156/283; 156/182; 156/325
[58] Field of Search ............... 156/313, 283, 325, 182, 156/319; 428/920, 921, 913, 309.9, 312.8, 320.2, 322.7, 330, 331, 305.5, 312.6, 317.7, 304.4, 319.1; 52/232, 806, 785

[56] References Cited

U.S. PATENT DOCUMENTS

| | | | |
|---|---|---|---|
| 3,259,536 | 7/1966 | Gaeth et al. | 428/921 |
| 4,015,386 | 4/1977 | Cook | 428/921 |
| 4,190,698 | 2/1980 | De Boel et al. | 428/913 |
| 4,297,252 | 10/1981 | Caesar et al. | 428/921 |

FOREIGN PATENT DOCUMENTS

| | | | |
|---|---|---|---|
| 48-22606 | 3/1973 | Japan | 428/921 |
| 53-113195 | 10/1978 | Japan | 428/921 |
| 55-254 | 1/1980 | Japan | 428/921 |
| 55-17585 | 2/1980 | Japan | 428/921 |
| 2007590 | 5/1979 | United Kingdom | 428/921 |

*Primary Examiner*—Edward C. Kimlin
*Assistant Examiner*—F. K. Wine
*Attorney, Agent, or Firm*—Wenderoth, Lind & Ponack

[57] ABSTRACT

A method for producing a fire-resistant, thermally insulating board, which comprises applying liquid hydrated sodium silicate (B) onto the inner surface of a facing material or sheet (A), spreading powdery hydrated sodium silicate (C) over the said applied surface, laying the said spread surface on (1) a facing material or sheet (D),
(2) a facing material or sheet (D) applied in advance with liquid hydrated sodium silicate (B) or
(3) a facing material or sheet having powdery hydrated sodium silicate (C) spread further over the applied surface of (2), implementing the heating and pressing procedure for gluing the assembly, and laminating the resulting fire-resistant board (E) with rigid isocyanurate foam (F).

The fire-resistant, thermally insulating board shows reduced fusing and combustion of the rigid isocyanurate foam (F) even when exposed to flame and posseses superior mechanical properties.

16 Claims, 3 Drawing Figures

METHOD FOR PRODUCING FIRE-RESISTANT, THERMALLY INSULATING BOARD

This invention relates to a method for producing a thermally insulating board which can be continuously produced on an industrial scale and which exhibits superior fire resistance.

So far, there have been proposed a variety of methods of producing fire-resistant, thermally insulating boards by means of a combination of water-glass (sodium silicate) based fire retardants and foamed synthetic resins. Among them, is known the process which comprises applying liquid hydrated sodium silicate on the inner surface of e.g. a facing material for construction panels, eliminating the moisture in the sodium silicate, and further providing a foamed layer of a synthetic resin such as rigid polyurethane foam.

Nevertheless, the process, in which a time as long as 3 to 6 hours is taken to eliminate the moisture in coating films of liquid hydrated sodium silicate and space for drying is required, is disadvantageous in that the boards cannot be produced continuously on a mass production basis.

The present inventors, after extensive investigation, have discovered that the production steps in such a process can be considerably reduced in terms of time by applying liquid hydrated sodium silicate (B) onto the inner surface of a facing material or sheet (A), spreading powdery hydrated sodium silicate (C) over the said applied surface, laying the said spread surface on (1) a facing material or sheet (D), or
(2) a facing material or sheet (D) applied in advance with liquid hydrated sodium silicate (B) or
(3) a facing material or sheet having powdery hydrated sodium silicate (C) spread further over the applied surface of (2), implementing the heating and pressing procedure for gluing the assembly to obtain fire-resistant board (E).

It was also found out that fire-resistant, thermally insulating board obtained by laminating the above fire-resistant board (E) with rigid isocyanurate foam (F) shows reduced fusing and combustion of the rigid isocyanurate foam (F) even when exposed to flame.

The above findings were followed by further research which has resulted in this invention.

Thus, this invention relates to a method for producing a fire-resistant, thermally insulating board, which comprises applying liquid hydrated sodium silicate (B) onto the inner surface of a facing material or sheet (A), spreading powdery hydrated sodium silicate (C) over the said applied surface, laying the said spread surface on (1) a facing material or sheet (D),
(2) a facing material or sheet (D) applied in advance with liquid hydrated sodium silicate (B) or
(3) a facing material or sheet having powdery hydrated sodium silicate (C) spread further over the applied surface of (2), implementing the heating and pressing procedure for gluing the assembly, and laminating the resulting fire-resistant board (E) with rigid isocyanurate foam (F).

As the facing material or sheet (A) and (D) which is used in this invention, use may be made of any known facing materials or sheets, and there may be mentioned, by way of specific example, metal plates such as an iron plate, an aluminum foil, an aluminum plate and a galvanized iron sheet, inorganic boards, such as slate, a flexible board, a perlite board, an asbestos cement board, an asbestos calcium silicate board, an asbestos perlite board, asbestos cement calcium silicate board, a wood-wool cement board, a gypsum board, a gypsum cement board and a rock wool board, or their composite materials such as a metal-foil glued sheets, for example, aluminium foils glued with paper, cloth, a synthetic resin film, etc. Such facing materials or sheets may be provided on their surfaces with a rustproof treatment, waterproof treatment or other treatments such as painting. In such cases, the thickness of the layers is in the range of about 5$\mu$ to 20 mm, preferably about 0.05 mm to 10 mm. The facing materials or sheets (A) and (D) may be the same or different, respectively.

According to this invention, liquid hydrated sodium silicate (B) is applied on the inner surface of the facing material or sheet (A).

The sodium silicate used herein means a composition consisting of moisture and a compound of the general formula $M_2O \cdot XSiO_2$ (wherein M is alkali metal such as sodium and potassium, and X is a number of 1 to 4) and, as the liquid hydrated sodium silicate (B) in this invention, use is suitably made of a silicate with about 30 to 45% of a solids content or a weight ratio of $(M_2O + XSiO_2)$.

Added to, or incorporated into such liquid hydrated sodium silicate (B), may be the compounds such as boron compounds, which upon heating expand with evolution of water or gas, metal oxides and hydroxides such as zinc oxide and aluminum hydroxide, porous inorganic fire-retardant agents such as perlite and vermiculite, inorganic substances such as bentonite and mountain leather, water absorbing agents such as gypsum and zeolite, inorganic fibers, emulsions of synthetic resins such as polyvinyl acetate, and the like. The addition of mountain leather makes the sodium silicate thixotropic, thus permitting the application to a thicker coating film. In addition, incorporation of glass fibers improves the strength and adhesive property, and is desirable.

As examples of the application technique, there may be mentioned known means with the use of brush, blade, doctor knife, spray, roll coater, flow coater, etc.

The application rate is in the range of about 0.05 to 6 kg/m$^2$, preferably about 0.1 to 4 kg/m$^2$.

According to this invention, powdery hydrated sodium silicate (C) is spread over the surface of applied with the liquid hydrated sodium silicate (B).

As the powdery hydrated sodium silicate (C), whose composition is represented by the above-mentioned general formula, use is desirably made of one with about 50% to 98% preferably about 60% to 90%, of a solids content, or a weight ratio of $(M_2O + XSiO_2)$.

Added to the powdery hydrated sodium silicate (C) may be the above-mentioned metal oxides and hydroxides, porous inorganic fire-retardant agents, etc. The powdery hydrated sodium silicate (C) has preferably a particle size of not more than 10 mesh.

As the means of spreading, there may be mentioned, by way of example, a known powder-spreading apparatus such as a powder feeding apparatus. After the powdery hydrated sodium silicate (C) is spread, the applied thickness may be equalized by the use of a doctor knife, etc.

The spreading rate is in the range of about 0.05 to 6 kg/m$^2$, preferably about 0.1 to 4 kg/m$^2$, but is desirably such that the spreading relates to the weight ratio of the liquid hydrated sodium silicate (B) and the powdery hydrated sodium silicate (C) such as to be within the range of about 70:30 to 30:70 and to the solids content of the hydrated sodium silicate in the range of about 50% to 80%.

After the powdery hydrated sodium silicate (C) is spread, the spread surface is laid on (1) a facing material or sheet (D), or
(2) a facing material or sheet (D) applied in advance with liquid hydrated sodium silicate (B) or
(3) a facing material or sheet having powdery hydrated sodium silicate (C) spread further on the applied surface of (2), and the assembly is glued by the heating and pressing procedure, thereby yielding a fire-resistant board (E).

In the case of (2) as mentioned above, the application rate of the liquid hydrated sodium silicate (B) is in the range of about 0.05 to 6 kg/m$^2$, preferably about 0.1 to 4 kg/m$^2$. In the case of (3) as mentioned above, furthermore, the powdery hydrated sodium silicate (C) is spread in such a way that the weight ratio of the liquid hydrated sodium silicate (B) and the powdery hydrated sodium silicate (C) be within the range of about 70:30: to 30:70, with the weight ratio of solids in the hydrated sodium silicate being about 50 to 80%.

The heating and pressing procedure is implemented by use of an apparatus such as a hydraulic press, a pneumatic press, a heat roll and a double conveyor.

The heating temperature is in the range of about 50° to 120° C., preferably about 60° to 100° C., and the pressure is in the region of about 0.01 to 50 kg/cm$^2$, preferably about 0.1 to 20 kg/cm$^2$.

The length of time for which the heating and pressing procedure is conducted is normally in the range of about 0.5 to 30 minutes.

In the continuous production of the fire-resistant board (E), the following equipment may be used. An apparatus, which conveys the two layers of the top and bottom facing materials or sheets (A) and (D) successively in one direction, while opposing each other into a laminator section equipped with pressure rolls capable of heating and pressing, such as double conveyor. Mounted in front of the laminator section are devices which serve to apply and spread the liquid and powdery hydrated sodium silicate (B) and (C) in that order, whereby application and spreading are conducted on the inner surface of the bottom layer of the facing material or sheet. In addition, the applying and spreading devices each for the liquid and powdery hydrated sodium silicate (B) and (C) are also mounted in that order in front of the laminator section for the top layer of the facing material or sheet provided through tension rolls, whereby application or spreading is carried out, if necessary. By conveying the assembly successively into the laminator section, followed by heating and pressing for gluing, continuous forming of the fire-resistant boards (E) may be carried out. Furthermore, the production is feasible by a batch-wise process as well: thus, the liquid hydrated sodium silicate (B) and the powdery hydrated sodium silicate (C) are laminated on the inner surface of the facing material or sheet (A) by use of an applying or spreading device, and heating and pressing by means of a press is carried out to facilitate the production of the boards. Further, heating, followed by applying by rolls, may be conducted.

The thickness of the fire-resistant board (E) thus-obtained is ordinally in the range of about 0.3 to 10 mm. The fire-resistant board (E), although the appearance of its sodium silicate layer looks slightly turbid, exhibits hardness and flexural strength equal to conventional boards while the foaming properties upon heating are superior to conventional fire-resistant boards produced by applying liquid hydrated sodium silicate and eliminating the moisture in the coating film.

In this invention, the fire-resistant board (E) is laminated with a rigid isocyanurate foam (F).

As the specific means of lamination, there may be mentioned, by way of example, a means of feeding for a foaming raw material for producing a rigid isocyanurate foam on one side of the fire-resistant board (E), a means of laminating the fire-resistant board (E) with a previously foamed rigid isocyanurate foam (F) by use of a known adhesive, etc., a means of arranging two or more of the fire-resistant boards (E) with a pre-determined interspace and feeding a foaming raw material for producing a rigid isocyanurate foam into the space or spaces, and a means of arranging the fire-resistant board (E) and a facing material or sheet (A) with a predetemined interspace and feeding raw materials of used to produce a rigid isocyanurate foam into the space.

As the fundamental raw materials for forming the rigid isocyanurate foam, there may be mentioned organic polyisocyanates, polyols, blowing agents, cell regulating agents, catalysts for isocyanurate reaction and other catalysts and additives, and the procedures of foaming these materials include, for example, a one-shot or prepolymer process.

The organic polyisocyanates which are useful in this invention are those having at least two isocyanate groups in the molecule, and specific examples of these polyisocyanates include tolylene diisocyanate (TDI), diphenylmethane diisocyanate (MDI), xylylene diisocyanate (XDI), hexamethylene diisocyanate (HDI), hydrogenated MDI, hydrogenated XDI, their crude products, polyphenylenepolymethylene polyisocyanate (which is referred to as the so-called crude MDI (C-MDI) and is a mixture of the polynuclear polyisocyanates represented by the following formula, with the average of n being normally 0.1 to 1.3), and the like, whereby C-MDI is particularly desirably utilized.

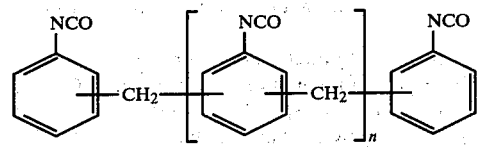

Such organic polyisocyanates are utilized singularly or as a mixture of not less than two kinds. In addition, these organic polyisocyanates can be used as prepolymers obtained by reacting them with a variety of active-hydrogen containing compounds having an excess of isocyanate groups in relation to the hydroxyl groups, and furthermore, modified isocyanates produced by converting them partially into allophanate, trimers and carbodiimides.

The polyols are the compounds having at least two hydroxyl groups in the molecule, being exemplified by polyether polyols or polyester polyols. Examples of the typical polyether polyols include polyether polyols obtained by adding ethylene oxide, propylene oxide, butylene oxide, etc. to polyols such as propylene glycol, glycerin, trimethylolpropane, pentaerythritol, α-methylglycoside, sorbitol, sucrose, etc., aminoalcohols such as diethanolamine, triethanolamine, tripropanolamine, etc., amines such as ethylenediamine, 1,6-hexamethylenediamine, diethylenetriamine, triethylenetetramine, tolylenediamine, methylene-bis-aniline, etc., phosphorus compounds such as phosphoric acid, pyrophosphoric acid, their partial esters, etc., and their mixtures. Also, as the polyol component, may be used, such materials as halogen-containing polyether polyols having a hydroxyl group number within the above-mentioned range obtained by adding epihalohydrins, etc. to polyols such as glycerin, trimethylolpropane, pentaerythritol and sorbitol in the presence of a cationic catalyst, such as $BF_3$. In addition, examples of the polyester polyols include hydroxyl-terminated polyester polyols obtained by condensing a diol such as ethylene glycol, propylene glycol, diethylene glycol, butylene glycol, etc., a triol such as trimethylolpropane, hexane triol, glycerin, etc., pentaerythritol, sorbitol, and the like with succinic acid, adipic acid, maleic acid, fumaric acid, phthalic acid, isophthalic acid, HET acid, succinic anhydride, maleic anhydride, phthalic anhydride, and the like, and polyesters obtained by the ring-opening polymerization of cyclic lactones with glycerin, pentaerythritol, sorbitol, etc. used as an initiator. Also employable as the polyol component are phosphonate-type polyols represented by tris(dipropylene glycol)phosphite, tris(dipropylene glycol)phosphate and Fryol-6 put on the market by Stauffer Chemical Co. of U.S.A. and phosphoroamidate-type polyols (as described in Japanese Published Examined Patent Application No. 22398/1977) obtained by reaction of dialkyl phosphite and monoalkanolamine as well as halogenated polyols such as brominated castor oil and halogenated aliphatic polyols, and the like.

As the catalysts, there may be mentioned, by way of example, co-catalysts of triethylenediamine and epoxy compounds, salts of carboxylic acids with alkali metals and alkaline earth metals, dialkylaminoalkylphenols, such as 2,4,6-tris(dimethylaminomethyl)phenol, hydroxides, alcoholates and phenolates of alkali metals and quaternary ammonium, and others, but these are not intended to limit the catalysts which are useful in this invention. Also, catalysts used for urethane reactions based on tertiary amines or organic tin compounds can be employed in conjunction the aforementioned materials.

As the blowing agent and cell regulating agent, use is suitably made of those which have been so far in general use, and there is no specific limitation: as the blowing agent, use is made of water as well as low boiling halogenated hydrocarbons such as trichlorofluoromethane, trichlorotrifluoroethane and methylene chloride, while, as the cell regulating agent, a variety of organic silicone based surfactant and others used in the production of polyurethane foams, etc. are utilized.

If necessary, furthermore, fire retardant agents of the additive type as mentioned above as well as fillers and reinforcing agents such as calcium carbonate, silica sand, clays (bentonite, kaolin, talc, vermiculite, etc.), diatomaceous earth, perlite, expanded vermiculite, Shirasu balloons, glass balloons, glass fibers, asbestos fibers, mountain leather, steel wool, synthetic fibers, chemical fibers, natural fibers, etc. may be added.

In order to accomplish continuously the procedure of laminating the rigid isocyanurate foam (F) on the fire-resistant board (E), for example, a double conveyor, etc. may be employed as is the case with the above-mentioned procedure for the fire-resistant board (E): that is to say, at the rear of the equipment for producing the fire-resistant board (E) is connected another set of double conveyor machines equipped with a heating apparatus, where the mixed chemicals for the rigid isocyanurate foam are shot onto the fire-resistant board (E) by a foaming machine in front of the double conveyor machine; subsequently, a facing material or sheet, if necessary, may be glued on the upper surface of the shot raw foaming solution during its gelling stage, followed by formation of a thermally insulating material of a definite thickness in the laminator section.

The density and thickness of the resultant rigid isocyanurate foam layer may be suitably chosen. Normally, the density is about 0.015 to 0.3 $g/cm^3$, preferably about 0.02 to 0.2 $g/cm^3$, and the thickness is generally in the range of about 10 to 200 mm, preferably about 15 to 150 mm.

According to this invention, following the application of the liquid hydrated sodium silicate (B) onto the inner surface of the facing material or sheet (A), the powdery hydrated sodium silicate (C) is spread over the said applied surface to thereby accomplish curing of the liquid hydrated sodium silicate (B) in an extremely shortened period of time. Therefore, this can eliminate the step of drying the coating films of the liquid hydrated sodium silicate (B) over a prolonged length of time as is the case with conventional processes, thus permitting reduction of the time of the manufacturing steps for producing the fire-resistant board (E).

Furthermore, the fire-resistant, thermally insulating board obtained according to this invention, even when exposed to flame, shows a reduced fusing and combustion of the rigid isocyanurate foam (F). Consequently, the material evolves lessened quantities of toxic gases and smoke, and exhibits excellent thermally insulating property during a fire. In addition, the material possesses superior mechanical properties and can find application in building materials such as roofs, cavity walls, floors, ceilings and other structural insulations etc.

Given in the following are the examples to illustrate this invention more specifically, whereby the term "part" used herein means "part by weight" and "%" all designate "% by weight".

REFERENCE EXAMPLE

| | |
|---|---|
| Liquid hydrated sodium silicate ($B_1$): | |
| Sodium silicate solution (M = Na, X = 3; with 40% of non-volatile content); | 100 parts |
| Sodium silicate powder (M = Na, X = 3; with 85% of non-volatile content); | 10 parts |
| Mountain leather paste (with 50% of non-volatile content); | 1 part |
| Bentonite; | 1 part |
| Glass fiber (6 mm); | 0.5 part |
| Liquid hydrated sodium silicate ($B_2$): | |
| Sodium silicate solution (M = Na, X = 3; with 40% of non-volatile content); | 100 parts |
| Sodium silicate powder (M = Na, X = 3; with 85% of non-volatile content); | 7 parts |
| Sodium metaborate | 10 parts |
| Mountain leather paste (with 50% of non-volatile content); | 2 parts |
| Bentonite | 1 part |
| Glass fiber (6 mm) | 0.5 part |
| Powdery hydrated sodium silicate ($C_1$): | |
| Sodium silicate powder (M = Na, X = 3; with 85% of non-volatile content); | 100 parts |
| Powdery hydrated sodium silicate ($C_2$): | |
| Sodium silicate power (M = Na, X = 3; | |

| with 85% of non-volatile content); | 100 parts |
| Sodium borate (borax); | 30 parts |

EXAMPLE 1

The liquid hydrated sodium silicate ($B_1$) as shown in the Reference Example was applied to a 0.5-mm thick steel plate with the use of brush at an application rate of 0.5 kg/m², and the powdery hydrated sodium silicate ($C_1$) was uniformly overspread at a rate of 1 kg/m²; the liquid hydrated sodium silicate ($B_1$) was similarly applied on the aluminum-foil surface of a sheet of aluminum-foil glued paper at a rate of 0.5 kg/m², followed by immediately heating and pressing with a press (60° C., 5 kg/cm², 5 minutes), thereby forming the fire-resistant board (E). The thickness of the board (E) was about 3 mm. The fire resistant material layer of this fire-resistant board (E) exhibits excellent flexural and adhesive properties (about 2 kg/cm²). When heating was made by a gas burner from the side of the steel plate of this fire-resistant board, furthermore, the fire-resistant material expanded to 20 mm of thickness. Then, the fire-resistant board and a 0.5-mm thick steel plate were opposed, and the below-mentioned raw solution for producing the rigid isocyanurate foam was poured into a gap between them to produce a foam, and thereby form a 45-mm thick panel. The fire resistance of the panel was tested in accordance with the fire-retardance testing method as stipulated in Japanese Industrial Standard A-1321 (1975) (Testing Method for Incombustibility of Internal Finish Material and Procedure of Buildings), and the results showed that the panel passed the rating of fire retardance grade 2 A.

| Raw solution for rigid isocyanurate foam: | |
|---|---|
| Polyphenylenepolymethylene polyisocyanate (C-MDI) (tradename; Millionate MR-200, Nihon Polyurethane Co., Ltd.; Amine equivalent of 136); | 136 parts |
| Ethylene oxide adduct of trimethylolpropane (tradename; Actcol IR-96, Takeda Chemical Industries, Ltd.; OH value of 430); | 18 parts |
| Ethylene glycol; | 2 parts |
| Diglycidyl ether of bisphenol A (tradename; EpoTohto YD-128, Tohto Kasei Co., Ltd.; epoxy equivalent of 190); | 7 parts |
| Triethylenediamine (33% dipropylene glycol solution, tradename; DABCO 33LV, Houdry); | 0.8 part |
| Potassium acetate (20% diethylene glycol solution); | 1.4 parts |
| Trichloromonofluoromethane; | 32 parts |
| Silicone type cell regulating agent (tradename; Shin-Etsu silicone F305, Shin-Etsu Chemical Co., Ltd.); | 0.7 part |
| Reactivity (at 20° C.); | |
| Cream time (CT), 13 seconds | |
| Gel time (GT), 26 seconds | |
| Rise time (RT), 50 seconds | |
| Density (overall) ≈ 0.040 g/cm³ | |

EXAMPLE 2

The liquid hydrated sodium silicate ($B_2$) as shown in the Reference Example was applied on a 0.7-mm thick aluminum plate with the use of a brush at a rate of 1.2 kg/m², and the powdery hydrated sodium silicate ($C_2$) was overspread at a rate of 1.3 kg/m²; then, an aluminum foil (30μ) was directly laid on it, followed by roll-treating on a hot plate for about 1 minute thereby forming a fire-resistant board. The thickness of the board (E) was about 3 mm. Then, the fire-resistant board and a 0.7-mm thick aluminum plate were placed opposite to each other, and between them was provided a rigid isocyanurate foam layer similar to the one in Example 1, thereby forming a 45-mm thick panel. The panel also passed the rating of fire retardance grade 2 A, and showed no fusion of the aluminum plate.

EXAMPLE 3

According to the same procedure in Example 1 by the use of the liquid hydrated sodium silicate ($B_1$) and the powdery hydrated sodium silicate ($C_1$) as shown in the Reference Example in the following weight ratios of $B_1$ and $C_1$, the following panels were obtained.

The test results of the panels in accordance with the fire-retardance testing method as mentioned before are as follows:

TABLE 1

| $B_1$ (Kg/m²)* | 1.4 | 1.2 | 1.0 | 0.8 | 0.6 |
|---|---|---|---|---|---|
| $C_1$ (Kg/m²) | 0.6 | 0.8 | 1.0 | 1.2 | 1.4 |
| Fuming factor per unit area (CA) | 6 | 10 | 8 | 5 | 10 |
| Temperature time curve exceeding reference temperature curve (t dθ) | 0 | 0 | 0 | 0 | 0 |
| Time of lingering flame (sec) | 0 | 5 | 12 | 10 | 15 |
| The rating of fire retardance grade 2A | passed | passed | passed | passed | passed |

*The application rate of $B_1$ on the steel plate was equal to that of $B_1$ on the aluminum-foil surface of the sheet of aluminum-foil glued paper.

Figure 2:
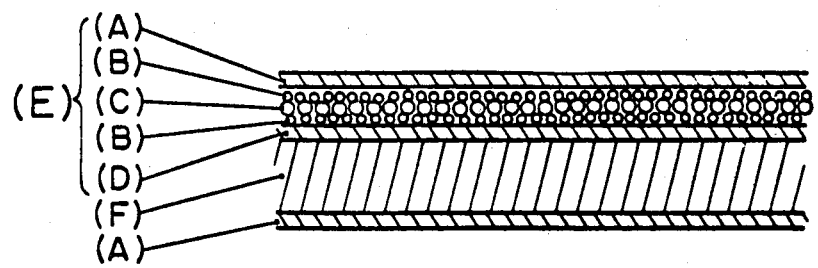
Figure 3:
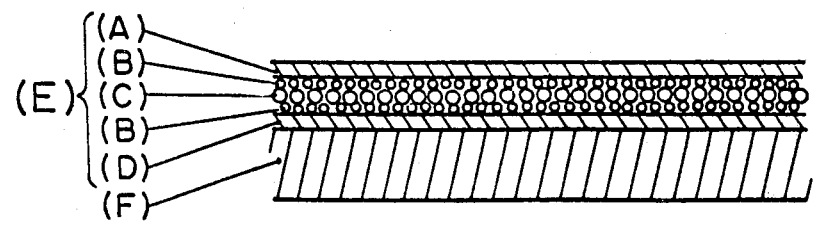

FIGS. 1, 2 and 3 represent each a cross-sectional view of the fire-resistant, thermally insulating board according to this invention. The reference characters (A) and (D) designate each a facing material or sheet; (B) liquid hydrated sodium silicate; (C) powdery hydrated sodium silicate; (E) a fire-resistant board; and (F) a rigid isocyanurate foam.

What is claimed is:

1. A method for producing a fire-resistant, thermally insulating board, which consists essentially of applying liquid hydrated sodium silicate (B) onto the inner surface of a facing material or sheet (A), spreading powdery hydrated sodium silicate (C) over the said applied surface, laying the said spread surface on
   (1) a facing material or sheet (D), or
   (2) a facing material or sheet (D) applied in advance with liquid hydrated sodium silicate (B) or
   (3) a facing material or sheet having powdery hydrated sodium silicate (C) spread further over the applied surface of (2), and then heating and pressing the thus-produced assembly to cure the liquid hydrated sodium silicate-powdery hydrated sodium silicate layers between the facing material (A) and the opposing facing material (D) to glue the assembly together to form a fire-resistant board (E), followed by laminating the resulting fire-resistant board (E) with a rigid isocyanurate foam (F).

2. A method as claimed in claim 1, wherein the facing material or sheet (A) is a metal plate and the facing material or sheet (D) is a metal-foil glued sheet.

3. A method as claimed in claim 1, wherein the application rate of the liquid hydrated sodium silicate (B) is within the range of about 0.05 to 6 kg/m$^2$.

4. A method as claimed in claim 1, wherein the spreading rate of the powdery hydrated sodium silicate (C) is within the range of about 0.05 to 6 kg/m$^2$.

5. A method as claimed in claim 1, wherein the weight ratio of the liquid hydrated sodium silicate (B) to the powdery hydrated sodium silicate (C) is within the range of about 70:30 to 30:70.

6. A method as claimed in claim 1, wherein the thickness of the fire-resistant board (E) is within the range of about 0.3 to 10 mm.

7. A method as claimed in claim 1, wherein the thickness of the rigid isocyanurate foam (F) is within the range of about 10 to 200 mm.

8. A method as claimed in claim 2, wherein the metal plate is a steel plate or aluminum plate and the metal-foil glued sheet is an aluminum foil glued with paper.

9. A fire-resistant, thermally insulating board, which is produced by a method consisting essentially of applying liquid hydrated sodium silicate (B) onto the inner surface of a facing material or sheet (A), spreading powdery hydrated sodium silicate (C) over the said applied surface, laying the said spread surface on
   (1) a facing material or sheet (D), or
   (2) a facing material or sheet (D) applied in advance with liquid hydrated sodium silicate (B) or
   (3) a facing material or sheet having powdery hydrated sodium silicate (C) spread further over the applied surface of (2),
and then heating and pressing the thus-produced assembly to cure the liquid hydrated sodium silicate-powdery hydrated sodium silicate layers between the facing material (A) and the opposing facing material (D) to glue the assembly together to form a fire-resistant board (E), followed by laminating the resulting fire-resistant board (E) with a rigid isocyanurate foam (F).

10. A board as claimed in claim 9, wherein the facing material or sheet (A) is a metal plate and the facing material or sheet (D) is a metal-foil glued sheet.

11. A board as claimed in claim 9, wherein the application rate of the liquid hydrated sodium silicate (B) is within the range of about 0.05 to 6 kg/m$^2$.

12. A board as claimed in claim 9, wherein the spreading rate of the powdery hydrated sodium silicate (C) is within the range of about 0.05 to 6 kg/m$^2$.

13. A board as claimed in claim 9, wherein the weight ratio of the liquid hydrated sodium silicate (B) to the powdery hydrated sodium silicate (C) is within the range of about 70:30 to 30:70.

14. A board as claimed in claim 9, wherein the thickness of the fire-resistant board (E) is within the range of about 0.3 to 10 mm.

15. A board as claimed in claim 9, wherein the thickness of the rigid isocyanurate foam (F) is within the range of about 10 to 200 mm.

16. A board as claimed in claim 10, wherein the metal plate is a steel plate or aluminum plate and the metal-foil glued sheet is an aluminum foil glued with paper.

* * * * *